United States Patent
Almog et al.

(10) Patent No.: US 11,035,803 B1
(45) Date of Patent: Jun. 15, 2021

(54) MULTI-PERSPECTIVE EXAMINATION OF A SPECIMEN

(71) Applicant: Applied Materials Israel Ltd., Rehovot (IL)

(72) Inventors: Ido Almog, Rehovot (IL); Ori Golani, Ramat Gan (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 16/802,480

(22) Filed: Feb. 26, 2020

(51) Int. Cl.
  *G01N 21/95* (2006.01)
  *G06T 7/00* (2017.01)

(52) U.S. Cl.
  CPC ....... *G01N 21/9501* (2013.01); *G06T 7/0004* (2013.01); *G06T 2207/30148* (2013.01)

(58) Field of Classification Search
  USPC .................................................. 382/144, 145
  See application file for complete search history.

(56) References Cited

U.S. PATENT DOCUMENTS

| | | | |
|---|---|---|---|
| 6,711,302 B1 * | 3/2004 | Lee | G06K 9/40 382/162 |
| 9,810,643 B1 | 11/2017 | Shoham et al. | |
| 2014/0285657 A1 | 9/2014 | Hwang et al. | |
| 2015/0193926 A1 | 7/2015 | Berlatzky et al. | |
| 2018/0052118 A1 | 2/2018 | Duffy et al. | |
| 2018/0073993 A1 | 3/2018 | Zhao et al. | |
| 2018/0144442 A1 | 5/2018 | Brauer | |
| 2018/0202943 A1 | 7/2018 | Chen et al. | |
| 2018/0342051 A1 | 11/2018 | Sezginer et al. | |

OTHER PUBLICATIONS

Huang et al. "Densely Connected Convolutional Networks," retrieved from https://arix.org/pdf/1608.06993.pdf, Jan. 28, 2018, 9 pages.

* cited by examiner

*Primary Examiner* — Suhail Khan
(74) *Attorney, Agent, or Firm* — Lowenstein Sandler LLP (57) ABSTRACT

There is provided a system and a method comprising obtaining data representative of potential defects in at least one image of a semiconductor specimen, for each potential defect of at least a first subset of potential defects of the semiconductor specimen, obtaining pixel values representative of the potential defect in multiple images of the specimen which differ from each other by at least one parameter, classifying the potential defects into a plurality of first clusters, for each first cluster, building, based on pixel values representative of potential defects, at least one first matching filter for the first cluster, for at least a given potential defect not belonging to the first subset, determining whether it corresponds to a defect based on the first matching filters associated with the plurality of first clusters.

17 Claims, 9 Drawing Sheets

MULTI-PERSPECTIVE EXAMINATION OF A SPECIMEN

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase at least part of the suspected locations are more thoroughly analyzed with relatively high resolution. In some cases both phases can be implemented by the same inspection tool, and, in some other cases, these two phases are implemented by different inspection tools.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter, there is provided a system of examination of a semiconductor specimen, the system comprising a processor and memory circuitry (PMC) configured to (1) for each potential defect of at least a first subset of potential defects of the semiconductor specimen, obtain pixel values representative of the potential defect in multiple images of the semiconductor specimen which differ from each other by at least one parameter, (2) classify the potential defects of the first subset into a plurality of first clusters, wherein the classification is based on pixel values representative of the potential defects in the multiple images, (3) for each first cluster, build, based on pixel values representative of potential defects of the first cluster in the multiple images, at least one first matching filter for the first cluster, (4) for at least a given potential defect not belonging to the first subset, process pixel values representative of the given potential defect in multiple images of the semiconductor specimen which differ from each other by at least one parameter, with each first matching filter obtained for each of the first clusters, and compare an output of the processing with at least one threshold, wherein the comparison is indicative of at least whether the given potential defect corresponds to a defect.

According to some embodiments, the multiple images differ from each other by at least one parameter selected in a list comprising illumination spectrum, a collection spectrum, illumination polarization, an illumination wavefront, collection polarization, angle of illumination, angle of incidence, angle of collection, one or more focus offsets of an illuminating light beam, a phase of the collected beam, a collection channel, a Fourier transform of returned light and sensing type.

According to some embodiments, building, based on pixel values representative of potential defects of the first cluster, at least one first matching filter for the first cluster, comprises determining a weighted average of pixel values representative of the potential defects of the first cluster in the multiple images.

According to some embodiments, the comparison is indicative of whether the given potential defect corresponds to a defect and if the given potential defect corresponds to a defect, the comparison is indicative of the first cluster to which the given potential defect corresponds the best among the plurality of first clusters.

According to some embodiments, the system is configured to, (5) if the comparison indicates that the given potential defect corresponds to a defect, include the given potential defect in the first subset, and repeat operations (2), (3), (4) and (5) until a convergence criterion is met.

According to some embodiments, the system is configured to, if the comparison indicates that the given potential defect corresponds to a defect, perform an inspection of a location of the given potential defect and if the comparison indicates that the given potential defect corresponds to a defect, provide a class of the given potential defect based on the first cluster to which the given potential defects corresponds the best among the plurality of first clusters.

According to some embodiments, building at least one first matching filter for the first cluster is based on pixel values representative of potential defects of the first cluster in the multiple images and on data representative of noise present in multiple images of the semiconductor specimen which differ by at least one parameter.

According to some embodiments, data representative of noise present in the multiple images include data representative of cross-covariance between pixel values belonging to the multiple images of the semiconductor specimen which differ by at least one parameter.

In accordance with certain aspects of the presently disclosed subject matter, there is provided a method of examination of a semiconductor specimen, the method comprising, by a processor and memory circuitry (PMC), (1) for each potential defect of at least a first subset of potential defects of the semiconductor specimen, obtaining pixel values representative of the potential defect in multiple images of the semiconductor specimen which differ from each other by at least one parameter, (2) classifying the potential defects of the first subset into a plurality of first clusters, wherein the classification is based on pixel values representative of the potential defects in the multiple images, (3) for each first cluster, building, based on pixel values representative of potential defects of the first cluster in the multiple images, at least one first matching filter for the first cluster, (4) for at least a given potential defect not belonging to the first subset, processing pixel values representative of the given potential defect in multiple images of the semiconductor specimen which differ from each other by at least one parameter, with each first matching filter obtained for each of the first clusters, and comparing an output of the processing with at least one threshold, wherein the comparison is indicative of at least whether the given potential defect corresponds to a defect.

According to some embodiments, the multiple images differ from each other by at least one parameter selected in a list comprising illumination spectrum, collection spectrum, illumination polarization, an illumination wavefront, collection polarization, angle of illumination, angle of incidence, angle of collection, one or more focus offsets of an illuminating light beam, a phase of the collected beam, a collection channel, a Fourier transform of returned light and sensing type.

According to some embodiments, building, based on pixel values representative of potential defects of the first cluster, at least one first matching filter for the first cluster, comprises determining a weighted average of pixel values representative of the potential defects of the first cluster in the multiple images.

According to some embodiments, the comparison is indicative of whether the given potential defect corresponds to a defect, and if the given potential defect corresponds to a defect, the comparison is indicative of the first cluster to which the given potential defect corresponds the best among the plurality of first clusters.

According to some embodiments, the method includes, (5) if the comparison indicates that the given potential defect corresponds to a defect, including the given potential defect in the first subset, and repeating operations (2), (3), (4) and (5) until a convergence criterion is met.

According to some embodiments, the method comprises at least one of: if the comparison indicates that the given potential defect corresponds to a defect, performing an inspection of a location of the given potential defect, and if the comparison indicates that the given potential defect corresponds to a defect, providing a class of the given potential defect based on the first cluster to which the given potential defect corresponds the best among the plurality of first clusters.

According to some embodiments, building at least one first matching filter for the first cluster is based on pixel values representative of potential defects of the first cluster and on data representative of noise present in multiple images of the semiconductor specimen which differ by at least one parameter.

According to some embodiments, data representative of noise present in the multiple images include data representative of cross-covariance between pixel values belonging to the multiple images of the semiconductor specimen which differ by at least one parameter.

In accordance with certain other of the presently disclosed subject matter, there is provided a non-transitory computer readable medium comprising instructions that, when executed by a processor, cause the processor to perform operations as described above.

Among advantages of certain embodiments of the presently disclosed subject matter is improvement of detection and classification of defects. In some embodiments, the proposed solution takes advantage of the acquisition of multiple images of a specimen which differ by at least one parameter, in order to improve detection and classification of defects. Other advantages include ability to detect defects among a large number of potential defects, which cannot be achieved by conventional techniques implementing machine learning networks.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "obtaining", "comparing", "classifying", "building", "clustering", or the like, refer to the action(s) and/or process (es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system 103 and respective parts thereof disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
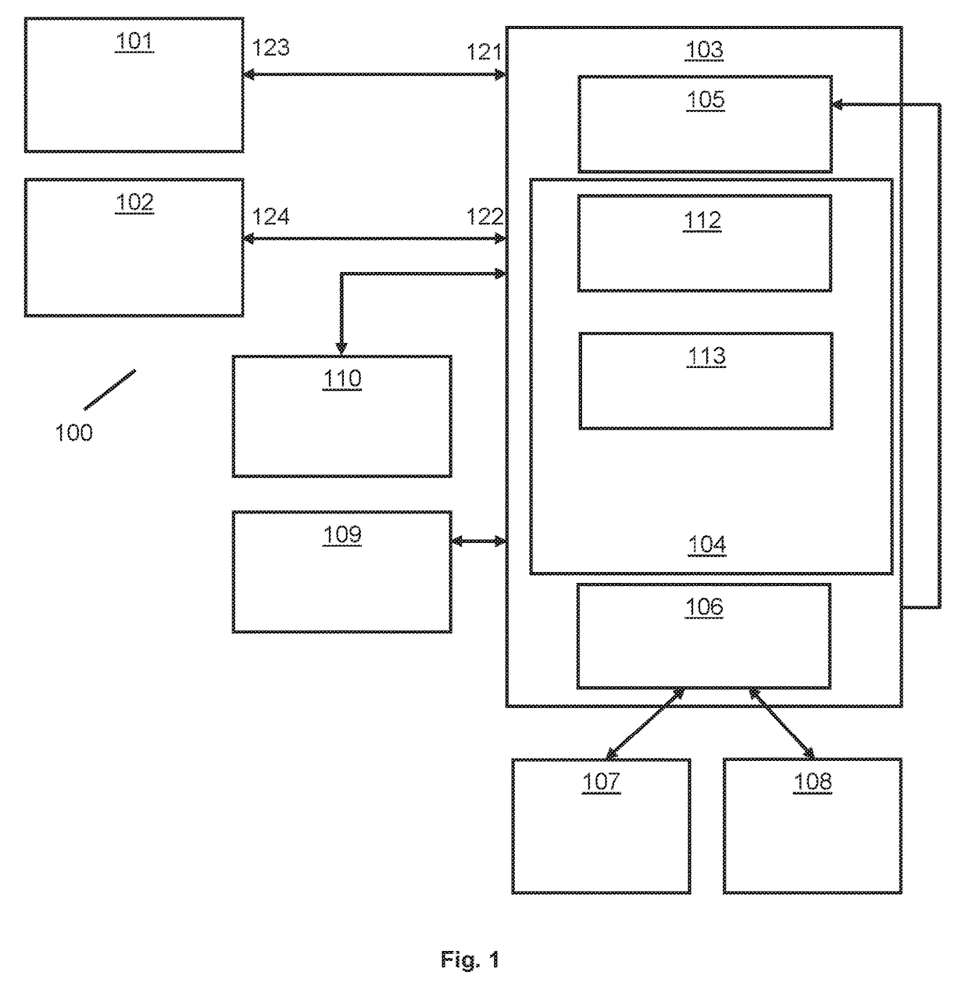
FIG. 1 illustrates a generalized block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as a part of the specimen fabrication process. The illustrated examination system 100 comprises computer-based system 103 capable of automatically determining metrology-related and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s). System 103 can be further operatively connected to CAD server 110 and data repository 109.

System 103 includes a processor and memory circuitry (PMC) 104 operatively connected to a hardware-based input interface 105 and to a hardware-based output interface 106. PMC 104 is configured to provide all processing necessary for operating the system 103 as further detailed hereinafter (see methods described in FIGS. 3 to 5, which can be performed at least partially by system 103) and includes a processor (not shown separately) and a memory (not shown separately). The processor of PMC 104 can be configured to execute several functional modules in accordance with computer-readable instructions implemented on a non-transitory computer-readable memory comprised in the PMC. Such functional modules are referred to hereinafter as comprised in the PMC. Functional modules comprised in PMC 104 include a data classifier 112 and a defect detector 113. Data classifier 112 can comprise e.g. a machine learning classification algorithm, such as k-means clustering, hierarchal clustering analysis, Gaussian mixture model analysis, or Deep Neural Network (DNN). A combination of several such clustering algorithms may also be used. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture or otherwise. Optionally, at least some of the layers can be organized in a plurality of DNN sub-networks. Each layer of DNN can include multiple basic computational elements (CE) typically referred to in the art as dimensions, neurons, or nodes. Operations that can be carried out by defect detector 113 will be described hereinafter (see in particular operations 320, 330, 340, 350, 380, 385, 390 and 395). In some embodiments, data classifier 112 and defect detector 113 can be implemented using the same functional module in the PMC 104.

System 103 is configured to receive, via input interface 105, input data. Input data can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen.

System 103 is further configured to process at least part of the received input data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating system 103.

By way of non-limiting example, a specimen can be examined by one or more low-resolution examination machines 101 (e.g. an optical inspection system, low-resolution SEM, etc.). The resulting data (referred to hereinafter as low-resolution image data 121) informative of low-resolution images of the specimen can be transmitted—directly or via one or more intermediate systems—to system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122) informative of high-resolution images of the specimen can be transmitted—directly or via one or more intermediate systems—to system 103.

According to some embodiments, at least one of the examination machines 101, 102 is configured to illuminate a region of a specimen. The radiation may be visible, ultraviolet (UV) radiation, deep UV radiation, extreme UV radiation or any other type of radiation. Adapted optical and/or electronics elements allow collection and detection of the radiation from the region. The optics may include e.g. lenses, grids, telescopes, beam splitters, polarizers, reflectors, deflectors, apertures, and the like.

It is noted that images of a desired location on a specimen can be captured at different resolutions. By way of non-limiting example, so-called "defect images" of the desired location are usable to distinguish between a defect and a false alarm, while so-called "class images" of the desired location are obtained with higher resolution and usable for defect classification. In some embodiments, images of the same location (with the same or different resolutions) can comprise several images registered therebetween (e.g. images captured from the given location and one or more reference images corresponding to the given location).

It is noted that image data can be received and processed together with metadata (e.g. pixel size, text description of defect type, parameters of image capturing process, etc.) associated therewith.

Upon processing the input data (e.g. low-resolution image data and/or high-resolution image data, optionally together with other data as, for example, design data, synthetic data, etc.), system 103 can send the results (e.g. instruction-related data 123 and/or 124) to any of the examination tool(s), store the results (e.g. defect attributes, defect classification, etc.) in storage system 107, render the results via GUI 108 and/or send to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases the same examination tool can provide low-resolution image data and high-resolution image data. In some cases at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least part of examination tools 101 and/or 102, data repositories 109, storage system 107 and/or GUI 108 can be external to the examination system 100 and operate in data communication with system 103 via input interface 105 and output interface 106. System 103 can be implemented as stand-alone computer(s) to be used in conjunction with the examination tools. Alternatively, the respective functions of the system can, at least partly, be integrated with one or more examination tools.

According to some embodiments, at least one of the examination machines 101, 102 (imagers) can be used to acquire multiple images of a region of a specimen. The multiple images differ from each other by at least one parameter selected in a list including at least illumination spectrum (which is the spectral response of an illumination portion of the imager), collection spectrum (which is the spectral response of a collection portion of the imager), illumination polarization (which is the polarization imposed by the illumination portion of the imager), collection polarization (which is the polarization imposed by the collection portion of the imager), angle of illumination (angle of illumination of the region by the illumination portion of the imager), angle of incidence (angle of incidence of the illumination portion with respect to the region), angle of collection, one or more focus offsets of an illuminating light beam, a phase of the collected beam, a collection channel (e.g. brightfield channel, greyfield channel), Fourier transform of returned light and a sensing type (for example— sensing amplitude and/or sensing phase). Such multiple images can be also called multi-perspective images. As shown, the parameter can correspond typically to an optical configuration which is modified between the different acquisitions.

At least one of the examination machines 101, 102 can include multiple detectors for generating the multiple images. According to some embodiments, different detectors may be allocated to detect radiation from different pupil segments of the multiple pupil segments—one detector per pupil segment. Each one of the multiple detectors may be located in a plane that is conjugate to the pupil plane. The different pupil segments may not overlap, may completely non-overlap, or only partially overlap. The pupil segments can be of equal shape and size but at least two pupil segments may differ from each other by shape and additionally or alternatively by size and/or a position on the exit pupil plane. According to other embodiments, different detectors may be allocated to detect radiations of different combinations of (a) polarization and (b) different pupil segments of the multiple pupil segments. It should be noted that the pupil may not be segmented and each of the multiple detectors may be allocated to the entire pupil. These examples are not limitative.

Figure 2:
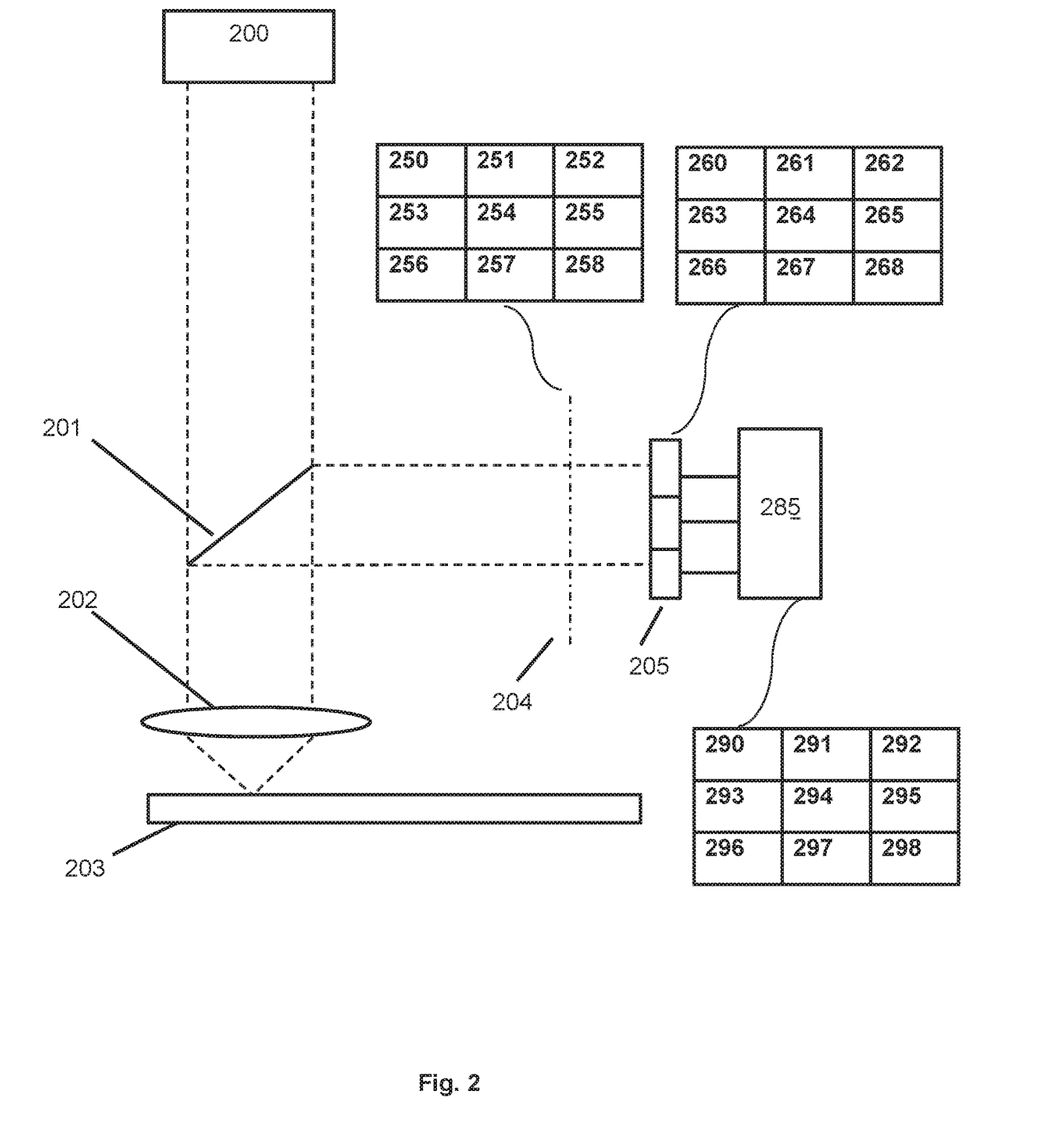
FIG. 2 illustrates an embodiment of an imager configured to acquire multiple images of a region of a specimen, which differ by an angle of collection of the radiation beam.

A non-limitative example of a configuration usable for acquiring multiple images of a region of a sample is shown in FIG. 2. In this example, the multiple images differ by a parameter which is the angle of collection (i.e. different pupil segments). This configuration can be used for an examination machine such as examination machines 101 and/or 102.

A radiation source 200 emits a radiation beam, which passes through first beam splitter 201 and is focused by objective lens 202 onto a region of specimen 203. Radiation beam from the region is collected by the objective lens 202 and reflected by first beam splitter 201 towards a pupil splitter 204 and a detector array 205. An image processor 285 is connected to the detector array 205, for processing/outputting the images.

In this example, pupil 204 is segmented to nine segments 250 to 258 (first pupil segment 250, second pupil segment 251, . . . , and ninth pupil segment 258). Similarly, detector array 205 includes nine detectors 260 to 268, that are arranged in a 3×3 grid—one detector per pupil segment.

For a given region of the sample, nine images 290 to 298 are generated (one image per detector) that differ from each other by the angle of collection.

Figure 2A:
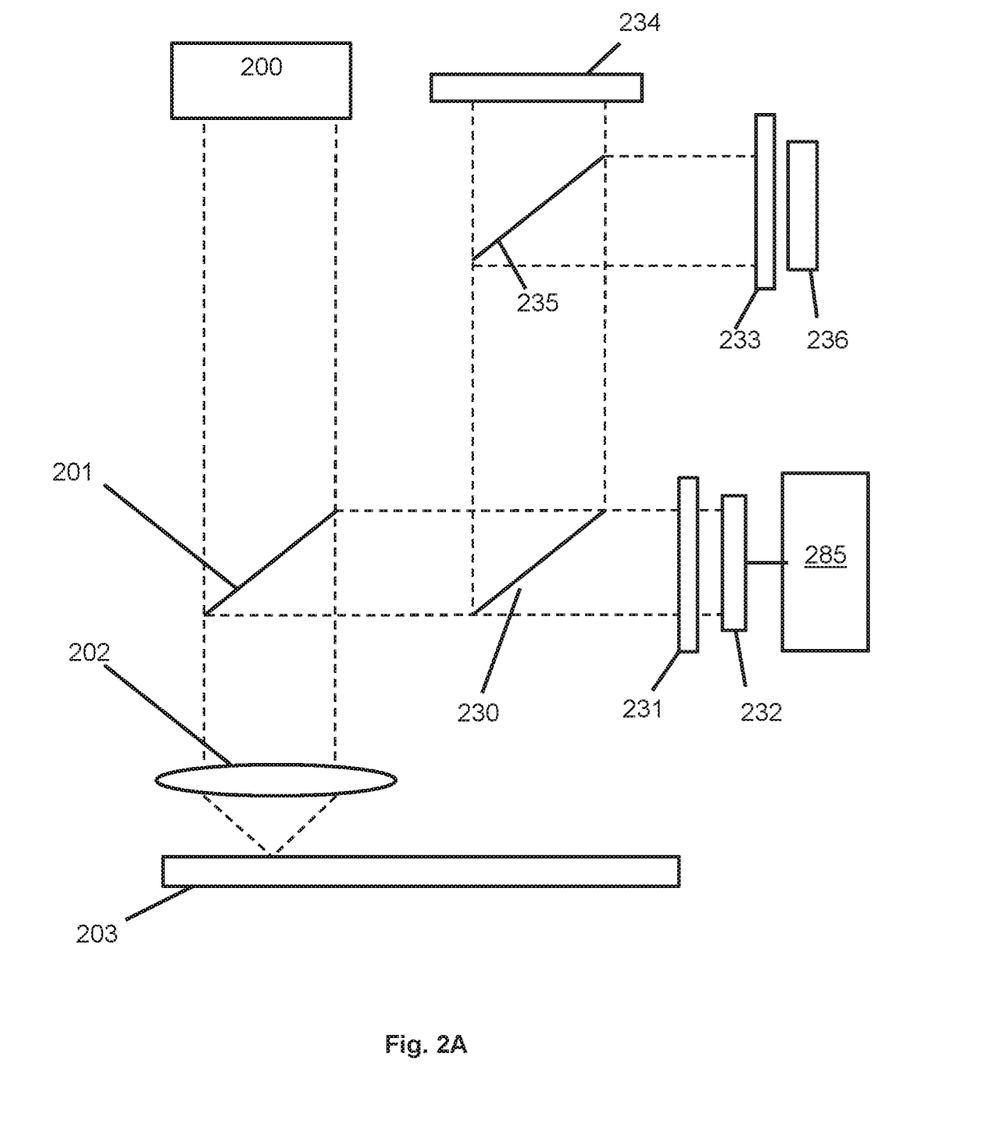
FIG. 2A illustrates an embodiment of an imager configured to acquire multiple images of a region of a specimen, which differ by a polarization of the radiation beam.

Another non-limitative example of a configuration usable for acquiring multiple images of a region of a specimen which differ by one parameter (in this example, polarization) is shown in FIG. 2A.

A radiation beam originating from the region is collected by the objective lens 202 and reflected by first beam splitter 201 towards a second beam splitter 230, which splits the radiation into:
  a first radiation transmitted towards a first polarizer 231 and a first detector 232;
  a second radiation transmitted towards a second polarizer 235.

The second polarizer splits the second radiation into:
  a third radiation transmitted towards a second detector 234;
  a fourth radiation transmitted towards a third polarizer 233 and a third detector 236.

Each of the first, second and third first detectors 232, 236 and 234 receives radiation from the entire pupil. Therefore, for each region of the specimen, three different images of the full region are obtained, which differ by the polarization of the radiation.

Figure 3:
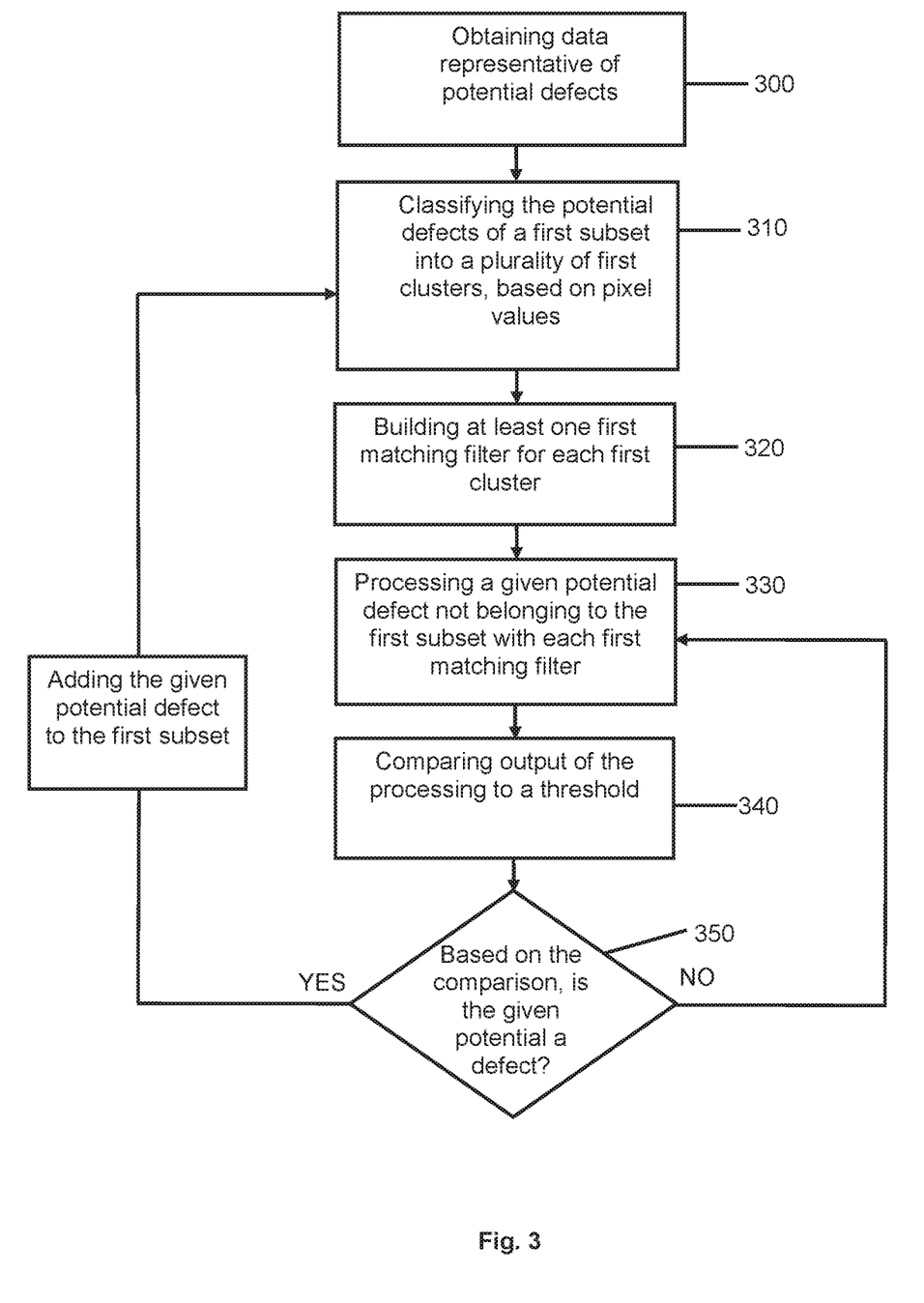
FIG. 3 illustrates a generalized flow-chart of a method of building a set of first matching filters based on data representative of defects in one or more images of a semiconductor specimen.

Attention is now drawn to FIG. 3, which describes a method of examination of a semiconductor specimen, which can be performed e.g. during a training phase. According to some embodiments, the semiconductor specimen can include e.g. a wafer or an optical mask. The method includes (operation 300) obtaining data representative of potential defects in at least one image of the semiconductor specimen. This data can comprise a list of potential defects together with pixels (each pixel being associated with at least one pixel value) of the image in which the potential defects are located. This data can be obtained using various methods. According to some embodiments, the semiconductor specimen may have already undergone an optical inspection using one or more examination tools (for example similar to examination tools 101 and 102), and results of the inspection can be used to provide location of potential defects. According to other embodiments, operation 300 can comprise performing an inspection process on the specimen using examination machine 101, which provides data representative of location of potential defects. According to some embodiments, the specimen can undergo further examination using examination machine 102, in order to reduce the list of locations of potential defects.

According to some embodiments, a first subset of defects (see operation 310) is obtained by using a high detection threshold during examination (e.g. by the low-resolution examination tool 101—thereby obtaining a small number of candidate locations). For examples, the number of candidate locations can be between 100 and 1,000. These values are not limitative. According to other embodiments, a large number of potential defects is obtained by using a low detection threshold during examination (e.g. by the low-resolution examination tool 101—thereby obtaining a large number of candidate locations, for example higher than 100,000) and a first subset of defects can be selected among this large number of potential defects. The selection of the first subset of defects can include selecting defects which are associated with a probability indicative of a defect higher than a threshold (e.g. set by an operator).

The method can further include (310), for at least the first subset of the potential defects, classifying the potential defects of the first subset into a plurality of first clusters. This classification can be performed e.g. by data classifier 112. The classification can be based on pixel values representative of the potential defects in at least one image. Each potential defect is associated with one or more pixels in at least one image. In a given image, each pixel is associated with at least one pixel value representative of the intensity of the pixel in this given image.

According to some embodiments (see FIG. 4), pixels representative of a potential defect 400 can include:
one or more pixels 410 at which the potential defect is located; and
a plurality of neighboring pixels 420 located around the one or more pixels 410.

Figure 4:
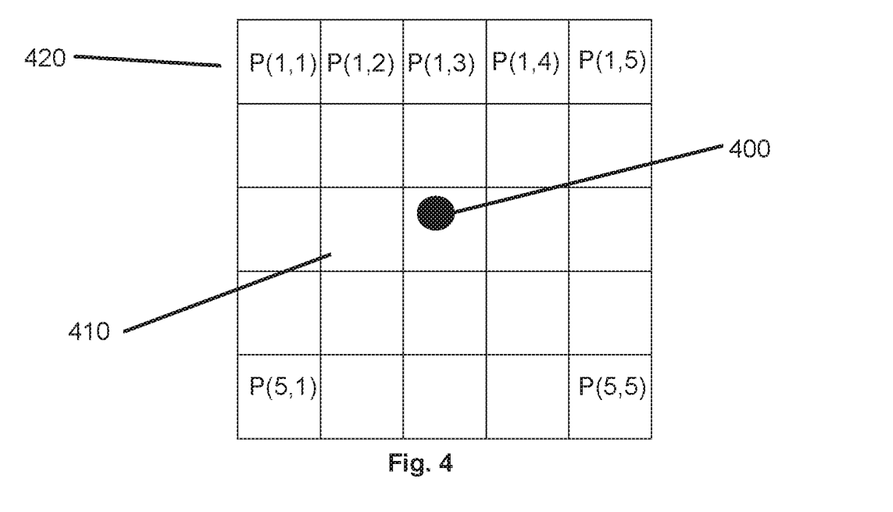
FIG. 4 illustrates an area of pixels in which a potential defect is present.

According to some embodiments, the number of plurality of pixels 410 can be set by an operator. Therefore, even if a potential defect is detected as appearing only in a few pixels, pixels representative of this potential defect will include an area of fixed size comprising these few pixels and additional pixels located around these few pixels. This is due to the fact that the effect of the presence of a defect at a given pixel will generally have an effect on neighbouring pixels, in particular when acquisition parameter of the image is varied (e.g. polarization, collection angle, see various examples above).

For example, it can be set that the one or more pixels 400 and the one or more pixels 410 constitute an area of five by five pixels, or nine by nine pixels. These values are not limitative.

Figure 4A:
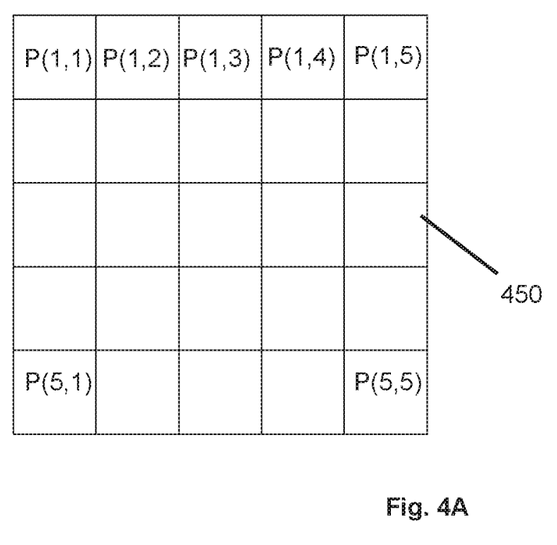
FIG. 4A illustrates data structures that can be used to represent an area of pixels including a defect when a single image of the area has been acquired.

Pixel values representative of a potential defect can be represented using a data structure such as a matrix, or a vector. A non-limitative example is shown in FIG. 4A. A matrix 450 can store, for each pixel representative of the potential defect (in this non-limitative example, pixels P(1,1) to P(5,5)), a corresponding pixel value. In other embodiments, a vector 460 can store, for each pixel representative of the potential defect, a corresponding pixel value.

As mentioned above, data classifier 112 classifies the first subset of the potential defects into a plurality of first clusters based on pixel values representative of the potential defects. In some embodiments, matrix 450 and/or vector 460 can be provided as an input of the data classifier 112.

Since the pixel values are representative of the pattern of the potential defects in the image, potential defects which share a similar pattern in the image will be assigned to the same cluster. Patterns include e.g. size of the defect, shape, orientation, size, colour (in case the imager can take images which include different colours), etc.

This classification can use the following algorithms: k-means clustering, hierarchal clustering analysis, Gaussian mixture model analysis, Deep Neural Network (DNN), and suchlike.

This classification can be unsupervised, that it to say that an operator is not required to provide the number of first clusters to the data classifier 112. Typically, the number of such clusters will correspond to the number of different defect types present in the specimen. Further classification may be done based on defect location, or any other property of the specimen. In some cases, the number of clusters may be determined by an operator. Alternatively, the number of clusters may be determined by the data classifier 112.

Figure 3A:
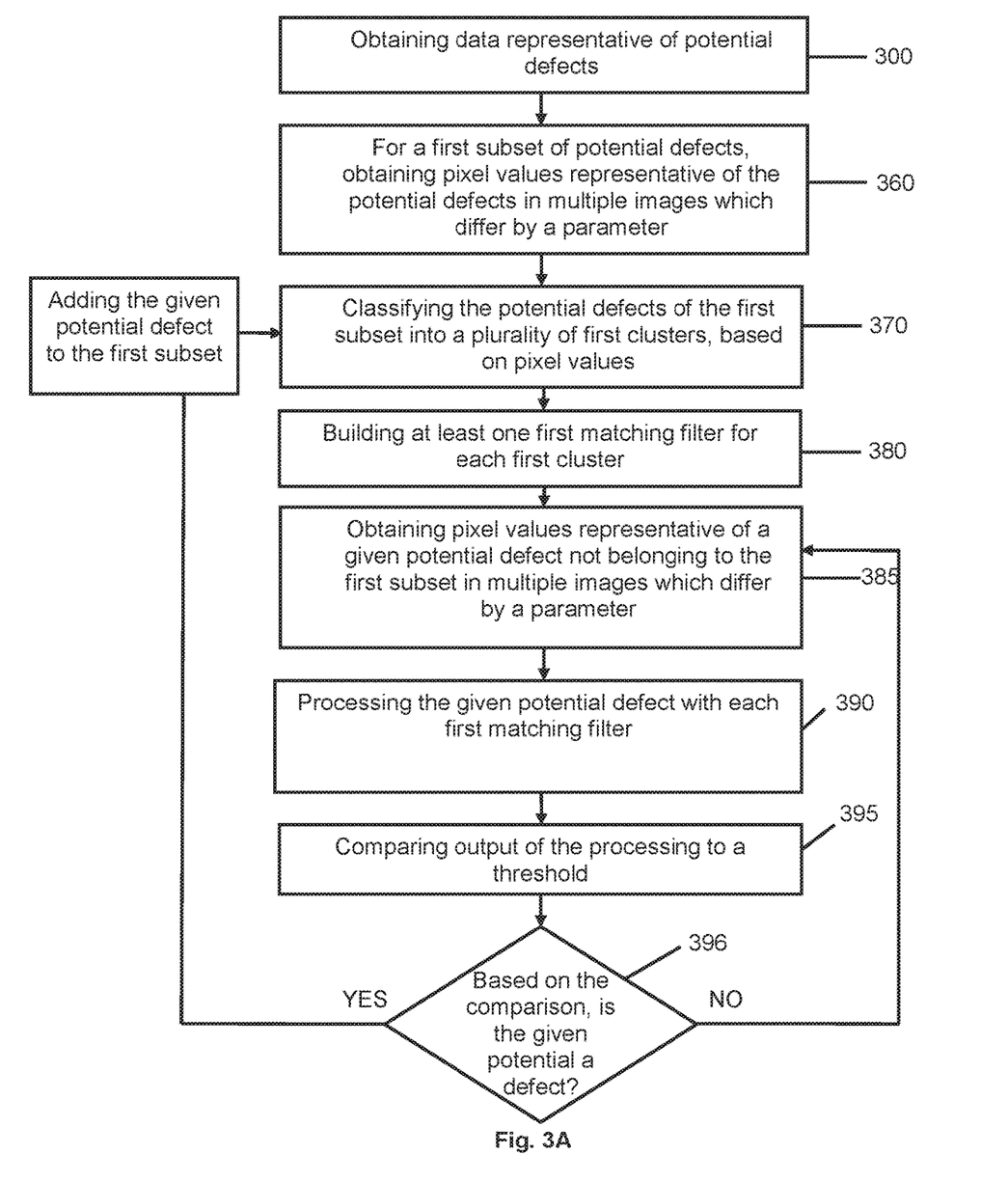
FIG. 3A illustrates a generalized flow-chart of a method of building a set of first matching filters based on data representative of defects in multiple images of a semiconductor specimen, wherein the multiple images differ by at least one parameter.

According to some embodiments, the method can include, for each potential defect of the first subset, obtaining pixel values representative of the potential defect in multiple images which differ from each other by at least one parameter. This is illustrated in FIG. 3A (see operation 360). Various examples of the least one parameter have been provided above, and therefore are not repeated.

In some embodiments, acquisition of the multiple images is performed after the first subset of potential defects has been selected. The imager is used to acquire again images of the potential defects of the first subset only, but this time with different parameters.

Assume N multiple images (for each potential defect) are acquired. Therefore, each pixel representative of a defect (as mentioned in FIG. 4 this can correspond to an area which includes the location of the potential defect and additional neighboring pixels) is associated with N pixel values (e.g. N intensities, one per image of the N multiple images). Since a parameter is changed between the different multiple images, the pattern of the defect is generally different between the N multiple images, thereby inducing a distribution of pixel values in the area of pixels which differs between the N multiple images.

As a consequence, each potential defect can be represented (see FIG. 4B) by a data structure such as a three dimensional matrix 470, which comprises, for each pixel $P(i,j)$, pixel values $P_1(i,j), \ldots, P_N(i,j)$. In other embodiments, the data structure can be also a vector 480 storing a list of all pixel values representative of a potential defect: $P_1(i,j), \ldots, P_N(i,j)$, for all relevant values of i and j.

Figure 4B:
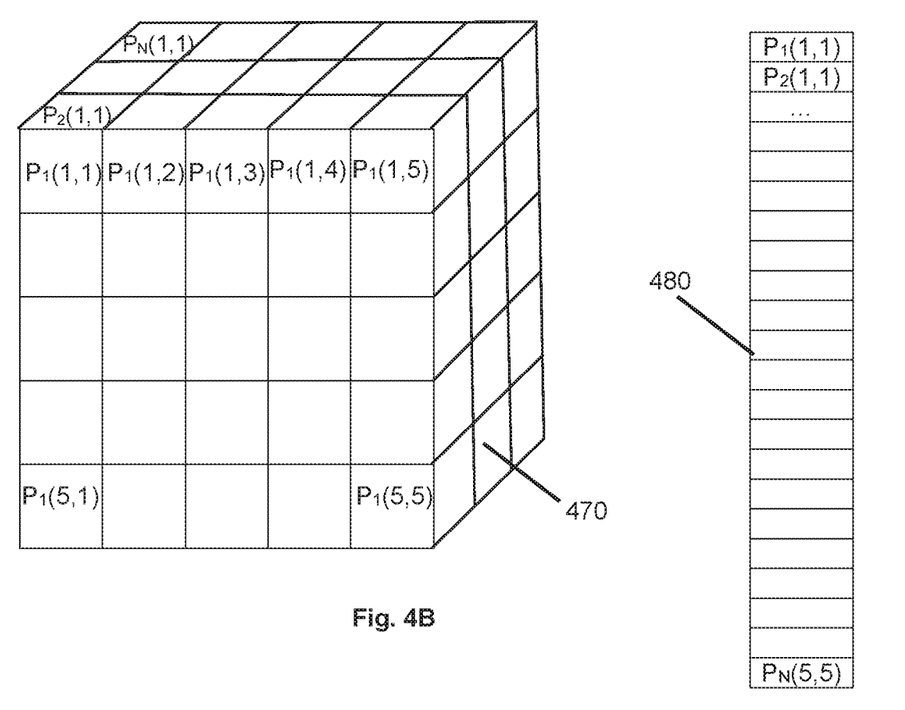
FIG. 4B illustrates data structures that can be used to represent an area of pixels including a defect when multiple images (which differ by at least one parameter) of the area have been acquired.

Data classifier 112 classifies (reference 370) the first subset of the potential defects into a plurality of first clusters based on pixel values representative of the potential defects. In some embodiments, matrix 470 and/or vector 480 can be provided as an input of the data classifier 112. Data classifier 112 can use similar algorithms to what was described in operation 310. The difference from operation 310 is in the input of the classifier, since in the method of FIG. 3, the number of pixel values for each pixel representative of a defect is higher than one.

Since the pixel values are representative of the pattern of the potential defects in the different multiple images, potential defects which share a similar pattern in the different multiple image will be assigned to the same cluster. Patterns include e.g. size of the defect, shape, orientation, size, color (in case the imager can take images which include different colors), etc.

Output of operation 310 (respectively operation 370) includes a plurality of first clusters, each including one or more potential defects of the first subset, and pixel values representative of the potential defects.

The method of FIG. 3 (respectively FIG. 3A) can comprise building at least one first matching filter for each first cluster, based on pixel values representative of potential defects of the first cluster. This corresponds to operation 320 (if each potential defect has been acquired with a single image), and operation 380 (if each potential defect has been acquired with multiple images differing by at least one parameter).

The first matching filter is determined to be representative of pixel values of all potential defects of the corresponding first cluster. According to some embodiments, the first matching filter can be determined by performing an average, or weighted average, of all pixel values of all potential defects of the corresponding first cluster.

According to some embodiments, the first matching filter Fc, for each first cluster C, can be determined as explained hereinafter. At operation 320, Equation 1 can be used for each first cluster C. Assume each potential defect K is associated in the image with an area comprising a plurality of pixels $P_K(i,j)$ with i from 1 to $i_{max}$ and j from 1 to $j_{max}$ (($i_{max} \times j_{max}$) corresponds to the total number of pixels within the area). An example of such an area is depicted in FIGS. 4 and 4A.

$$F_C(i, j) = \sum_{k=1}^{M} \frac{\alpha_k P_k(i, j)}{M} \quad \text{(Equation 1)}$$

$\alpha_k$ is a weighting parameter, which can be set by an operator. M is the total number of potential defects in the first cluster C.

In Equation 1, FC has the same size as an area of pixels associated with each potential defect. As explained above (see FIGS. 4 and 4A), each area can be represented equivalently by a vector and in this case, a similar equation can be used, in which a vector representation is used (and not a matrix representation as in Equation 1), and therefore the first matching filter can correspond to a vector which is the weighted average of all vectors of all potential defects of the first cluster C.

At operation 380, N multiple images of each potential defect are acquired (the images differ by at least one parameter, as explained above). If a matrix representation is used (with three dimensions, see left side of FIG. 4B) for representing each potential defect, Equation 1 can be used independently for each different type of acquisition of the multiple images (N different types of acquisition). The first matching filter of each first cluster can then correspond to the aggregation of each filter obtained for each value of N, and can be represented e.g. also as a three dimensional matrix.

If a vector representation is used to represent potential defects (see e.g. right side of FIG. 4B), then the first matching filter can correspond to the weighted average of all vectors of all potential defects of the first cluster C. Therefore, the first matching filter can be represented also as a vector.

According to some embodiments, other algorithms can be used to compute the first matching filter of each first cluster, such as, weighted least-squares estimation, histogram peak estimation, and suchlike.

At the output of operation 320 (respectively 380), a first matching filter is obtained for each first cluster.

The method can further include processing (see 330 and 390) at least one given potential defect which does not belong to the first subset, using the first matching filters obtained for each of the different first clusters. As mentioned in operations 300 and 310 (respectively 300, 360 and 370), only a first subset of the potential defects is first used to compute the first matching filters of the different first clusters. At operation 330 (respectively 390), at least one given potential defect which was not selected as being part of the first subset is now processed.

Processing of the given potential defect can include multiplying a data structure comprising pixel values representative of the given potential defect with each of the first matching filters. For example, assume that the given potential defect can be represented by a data structure "A". "A" can include one or more pixel values, depending on the size of the area of pixels which is used to represent the potential defect. An example of area of pixels is represented in FIGS. 4 and 4A.

Assume that at operation 310, Y different first clusters have been obtained (with Y an integer). Therefore, at operation 320, Y different first matching filters $F_{C1}, F_{C2}, \ldots,$ and $F_{CY}$ have been obtained.

For the case of two-dimensional matrix representation 450, operation 330 can comprise performing:

$$t_1 = \sum_{i,j} F_{C1}(i, j) A(i, j)$$

$$t_2 = \sum_{i,j} F_{C2}(i, j) A(i, j)$$

$$\ldots$$

$$t_Y = \sum_{i,j} F_{CY}(i, j) A(i, j)$$

In case that the data is represented in either vector form 460, the same operation may be defined analogously.

In some embodiments, operation 330 can also incorporate the properties of the noise affecting the different images. In such cases, the operation may be expressed as $$t_1 = \sum_{i,j} F_{C1}(i, j) K_{C1}(i, j) A(i, j)$$

-continued $$t_2 = \sum_{i,j} F_{C2}(i, j) K_{C2}(i, j) A(i, j)$$

$$\ldots$$

$$t_Y = \sum_{i,j} F_{CY}(i, j) K_{CY}(i, j) A(i, j)$$

In this notation, $K_{CY}$ are a set of elements of the same dimensions as A, whose values depend on various properties of the noise, such as its covariance. Data representative of noise can be generated based on pixels values of an image (or of a plurality of images which differ by at least one parameter) of a location of the semiconductor specimen which is assumed to be free of defects. For example, $K_{CY}$ may include correlations between different pixel values originating from the same perspective (same parameter as defined above), as well as correlations between pixel values originating from different perspectives (the multiple images differ by at least one parameter, thereby allowing computing "cross-perspective covariance(s)"—see hereinafter equations for the multi-perspective case). It should be noted that $K_{CY}$ may include any mathematical manipulation on the values of said correlations, as well as any other property of the noise affecting the samples. For example, the values of $K_{CY}$ may be chosen so that the summations above will provide an output with a lower noise level, thus improving the detection process. In the embodiment of FIG. 3A, the method can include (see 385) obtaining pixel values representative of the given potential defect in multiple images which differ by a parameter. This is equivalent to operation 360, but this time for the given potential defect. Similar parameters are used (for the image acquisition) in operations 360 and 385.

If multiple images of the given potential defect have been already acquired and are available, operation 385 can comprise obtaining pixel values representative of the given potential defect from these multiple images. If multiple images of the given potential defect are not available, operation 385 can comprise acquiring multiple images of the given potential defect (the multiple images differ by at least one parameter).

The method can comprise (390) processing the given potential defect with each first matching filter. This is similar to operation 330, but in this embodiment, the first matching cluster of each first cluster can correspond to a three dimensional matrix (the third dimension is due to the fact that each potential defect is acquired using N different images), or to a vector representative of the three dimensional matrix (as depicted in FIG. 4B).

Processing the given potential defect with each first matching filter can be performed similarly to what was described with reference to operation 330 above. A data structure A' comprising pixel values representative of the potential defect (as shown e.g. in FIG. 4B—A' can be e.g. a three dimensional matrix, or a one dimensional vector) is multiplied by each first matching filter ($F'_{C1}, \ldots F'_{CY}$) of each first cluster. If both A' and $F'_{Ci}$ are represented as a three dimensional matrix, then the multiplication can include $$t_y = \sum_{i,j,k} F'_{Cy}(i, j, k) A'(i, j, k)$$

If both A' and $F'_{Ci}$ are represented as vectors, then the multiplication can include $$t_y = \sum_i F'_{Cy}(i) A'(i)$$

In some embodiments, these operations may also include the properties of the noise (denoted $K_{CY}$, which is of the same size as A'), as mentioned above (therefore the two equations above can be modified by multiplying the right part by $K_{CY}$, as mentioned above).

As shown in FIG. 3 (operation 345), output of the processing of operation 330 can be compared to a threshold.

$$t_1 = \sum_{i,j} F_{C1}(i, j) A(i, j) > T_1?$$

$$t_2 = \sum_{i,j} F_{C2}(i, j) A(i, j) > T_2?$$

$$\ldots$$

$$t_Y = \sum_{i,j} F_{CY}(i, j) A(i, j) > T_Y?$$

Thresholds $T_1$ to $T_Y$ (which correspond to real values) can be set e.g. by an operator. In some embodiments, $T_1$ to $T_Y$ have the same value but this is not mandatory.

Similarly, in FIG. 3A, output of the processing of operation 390 can be compared (operation 395) to a threshold.

$$t_1 = \sum_{i,j,k} F'_{C1}(i, j, k) A'(i, j, k) > T'_1?$$

$$t_2 = \sum_{i,j,k} F'_{C2}(i, j, k) A'(i, j, k) > T'_2?$$

$$\ldots$$

$$t_Y = \sum_{i,j,k} F'_{CY}(i, j, k) A'(i, j, k) > T'_Y?$$

Thresholds $T'_1$ to $T'_Y$ (which correspond to real values) can be set e.g. by an operator. In some embodiments, $T'_1$ to $T'_Y$ have the same value but this is not mandatory. The thresholds $T_1$ to $T_Y$ and $T'_1$ to $T'_Y$ may be chosen such that the percentage of false alarms (i.e. cases wherein an area of the specimen, which is not defective, is mistakenly determined as defective) would not exceed a pre-defined (threshold) rate. These thresholds may be defined independently for each defect class, or defect type, so as to tune the false alarm rate independently for each defect class or defect type. For example, if the specific defect type of class is of higher importance than others, an operator may choose the corresponding threshold to be lower. Thus, more defects originating from this type or class will be detected (but this would in turn increase the number of false alarms).

Based on the comparison performed at operation 340 (respectively 395), it can be detected whether the given potential defect corresponds to a defect (see operation 350 in FIG. 3 and operation 396 in FIG. 3A).

If none of the comparisons meet the corresponding threshold (that is to say that the output of the multiplication is below the value of the threshold), then this is indicative of the fact that the given potential defect is not a defect. In the method of FIG. 3, the method can then comprise e.g. reverting to operation 330 for another given potential defect which does not belong to the first subset, and repeating operations 340 and 350. In the method of FIG. 3A, the method can then comprise e.g. reverting to operation 385 for another given potential defect which does not belong to the first subset, and repeating operations 390 and 395.

If at least one comparison meets the corresponding threshold, then this is indicative of the fact that the given potential defect is a true defect. As explained hereinafter, this comparison can be also helpful to identify to which of the first clusters the potential defect is the more similar (this corresponds to the first cluster for which the comparison provides an output which matches the best the corresponding threshold), which can be indicative of a class of the given potential defect. In the method of FIG. 3, the method can then include e.g. reverting to operation 310 in which the first subset is updated to further include the given potential defect (which has been identified as a defect). The method can include repeating operations 320, 330, 340 and 350, in order to identify new defects and update accordingly the different first matching filters. In the method of FIG. 3A, the method can then comprise e.g. reverting to operation 370 in which the first subset is updated to further include the given potential defect (which has been identified as a defect). The method can comprise repeating operations 380, 385, 390 and 395, in order to identify new defects and update accordingly the different first matching filters.

Each time the method is repeated (both in FIG. 3 and FIG. 3A), different first matching filters can be obtained. Iterations of the method can be stopped when a convergence criterion is met. The convergence criterion can be set e.g. by an operator. According to some embodiments, the convergence criterion can correspond e.g. to the fact that a sufficient number of potential defects have been processed for building the first matching filters. For example, if a large enough number of defects from each class (e.g. 100 per class—this is not limitative) has been detected, it can be determined that the convergence criterion has been met. Another possible convergence criterion is the fact that the parameters of the first matching filters converge and do not vary more than a threshold between successive iterations. For example, if after N iterations of the training method the set of obtained matching filter is $F_{C1}$ to $F_{CY}$, and after N+1 iterations the set of filters is $F_{C1}^*$ to $F_{CY}^*$, the method can include checking the relationship $|F_{Ci}-F_{Ci}^*|<H_i$, where $H_i$ is a pre-defined threshold. If the threshold is met for each class of defect, it can be concluded that the convergence criterion has been met. Furthermore, any combination of these convergence criteria may be used, as well as other possible metrics of convergence. Once the training described in FIG. 3 or FIG. 3A has been completed, a set of first matching filters (each associated with a different cluster of defects) is obtained which can be used during run-time, as shown in FIG. 5.

Figure 5:
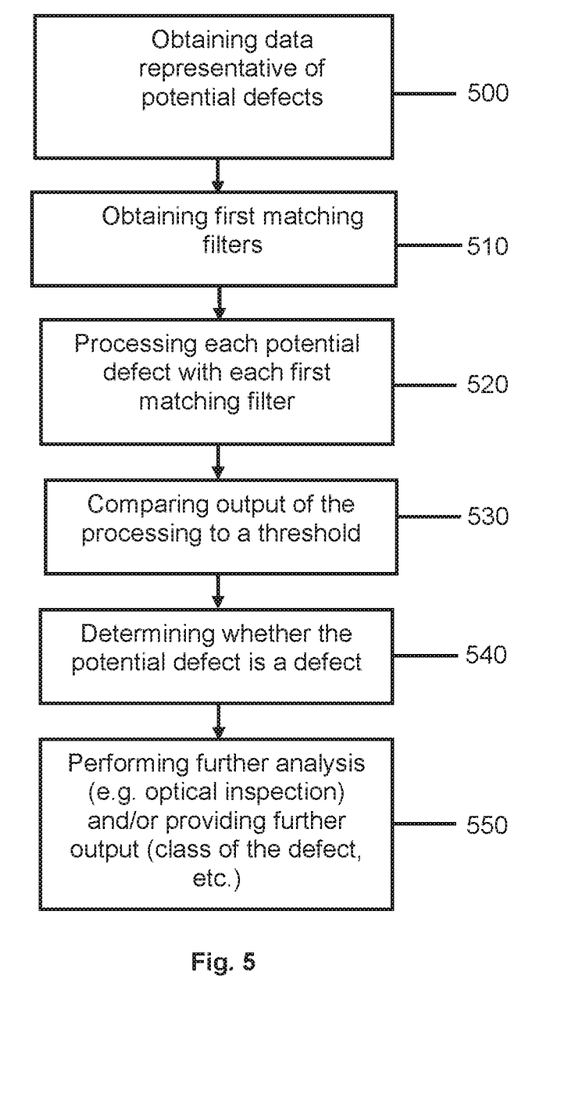
FIG. 5 illustrates a generalized flow-chart of a method of detecting defects using the first matching filters obtained using the method of FIG. 3 or the method of FIG. 3A.

The method of FIG. 5 can include obtaining (500) data $D_{raw}$ representative of potential defects in one or more images of a first specimen (this can include location of potential defects, and pixel values associated with the potential defects). This is similar to operation 300 above. $D_{raw}$ can be obtained e.g. using low-resolution examination tool 101, which is used to scan the whole first specimen. $D_{raw}$ can comprise a large amount of different potential defects, and it is attempted, during run-time, to reduce this number to a smaller number. According to some embodiments, $D_{raw}$ is obtained by using a low detection threshold during examination (e.g. by the low-resolution examination tool 101—thereby obtaining a high number of candidate locations). According to some embodiments, $D_{raw}$ differs from the first subset of potential defects (which has been used to build the first matching filters) in that it includes a larger number of candidate defect locations.

The method can include obtaining (510) first matching filters. The first matching filters are the output of the method of FIG. 3 or FIG. 3A, and each of the first matching filters is associated with a different first cluster of defects, as explained above. The training described in FIG. 3 or FIG. 3A can be performed on the first specimen itself during a training phase, or one or more other specimens which are comparable to the first specimen (e.g., die-to-die comparable wafers, cell-to-cell comparable wafers, etc.).

The method can include (520) processing one or more pixel values representative of each potential defect of $D_{raw}$ in the images with each first matching filter. As explained in FIGS. 4 and 4A, it can be set that an area of pixels of fixed size is representative of each potential defect. This area of pixels can be represented by a data structure "A" (e.g. matrix and/or vector) storing pixel values of this area.

As explained in FIG. 4B, in some embodiments, multiple images of each potential defect can be acquired, wherein the multiple images differ by at least one parameter (see examples above). In this embodiment, $D_{raw}$ can therefore store, for each potential defect, multiple images. These multiple images can be acquired by scanning the whole specimen using an imager (e.g. examination tool 101), each time by changing a parameter. As a consequence, in this embodiment, data structure "A" stores, for each potential defect, pixel values of the area in the different multiple images.

Processing 520 can comprise multiplying A with each of the first matching filters. Embodiments for performing this multiplication have been described above (in the training phase) with reference to operation 330 (in case a single image is acquired for each potential defect) and operation 390 (in case multiple images are acquired for each potential defect).

Output of this processing can be compared (see 530) to a plurality of thresholds (output of the multiplication of the data structure with each first matching filter can be compared to a threshold). This operation is similar to what was described (in the training phase) with reference to operation 340 (in case a single image is acquired for each potential defect) and operation 395 (in case multiple images are acquired for each potential defect).

Based on this comparison, it can be determined (reference 540) whether the potential defect corresponds to a defect.

If none of the comparisons meet the corresponding threshold (that is to say that the output of the processing 520 is below the threshold) then this is indicative of the fact that the potential defect is not a defect. This information can be used to remove this potential defect from $D_{raw}$, and/or to output this information to an operator.

If at least one comparison meets the corresponding threshold (that is to say that the output of the processing 520 is above the threshold for at least one first matching filter), then this is indicative of the fact that the potential defect is a true defect. This information can be used in various ways.

The method allows outputting (to an operator and/or to a device) a reduced list of defects (together with their location), which is of smaller size than the initial list of potential defects $D_{raw}$. According to some embodiments, for the defects belonging to the reduced list, the method can comprise performing (550) an additional optical inspection of a location of the defect. This can comprise e.g. using the high-resolution examination tool 102 to further confirm whether this defect does in fact correspond to a defect.

According to some embodiments, the comparison can be used to identify to which of the first clusters the potential defect is the more similar. This corresponds generally to the first cluster for which the comparison (530) provides an output which matches the best threshold (that is to say that the output obtained at operation 520 has the highest value). Since the first clusters are built (in the training phase) based on the pixel intensities and their distribution in the various images, they notably reflect shape or other geometrical properties of the defects. As a consequence, in some embodiments, some or all of the first clusters can be representative of specific classes of defects (e.g. types of defects, etc.). The class of defects associated with each first cluster can be defined e.g. by an operator. For example, assume a potential defect is identified as matching the best first cluster $C_Z$. This potential defect can be further investigated using e.g. high-resolution examination tool 102. The image taken by the high-resolution examination tool 102 can be used by an operator and/or by an ADR system to identify the specific class of the defect. This specific class can be attributed to the first cluster $C_Z$, which is now known to represent this specific class (in some embodiments attribution of a specific class to a first cluster is performed only after a plurality of potential defects have been identified as matching this first cluster and as belonging to this specific class).

According to some embodiments, after the run-time phase described in FIG. 5, a training phase can be performed again to improve the first matching filters. The training phase (as described in FIG. 3 or FIG. 3A) can use the list of defects identified during run-time as an input of the method (this list will be used similarly to the "first subset of defects" mentioned in the training phase).

As was detailed above, among advantages of certain embodiments of the presently disclosed subject matter is improvement of detection and classification of defects. By way of non-limiting examples, a defects' attribute space obtained from multi-perspective images (referred to hereinafter as multi-perspective attribute space) can be usable for increasing SNR (signal-to-noise ratio) of detection process, improving nuisance filtering by increasing separation between nuisances and DOIs (defects of interest), increasing of sampling effectiveness, etc. Likewise, multi-perspective attribute space can be usable for identifying correlation of noise profile and/or best-separating and/or best-filtering attributes with one or more perspectives and thereby for tailoring respective recipes.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system of examination of a semiconductor specimen, the system comprising a processor and memory circuitry (PMC) configured to:
  (1) for each potential defect of at least a first subset of potential defects of the semiconductor specimen, obtain pixel values representative of the potential defect in multiple images of the semiconductor specimen which differ from each other by at least one parameter,
  (2) classify the potential defects of the first subset into a plurality of first clusters, wherein the classification is based on pixel values representative of the potential defects in the multiple images,
  (3) for each first cluster,
    build, based on pixel values representative of potential defects of the first cluster in the multiple images, at least one first matching filter for the first cluster,
  (4) for at least a given potential defect not belonging to the first subset,
    process pixel values representative of the given potential defect in multiple images of the semiconductor specimen which differ from each other by at least one parameter, with each first matching filter obtained for each of the first clusters, and
    compare an output of the processing with at least one threshold, wherein the comparison is indicative of at least whether the given potential defect corresponds to a defect.

2. The system of claim 1, wherein the multiple images differ from each other by at least one of: illumination spectrum, a collection spectrum, illumination polarization, an illumination wavefront, collection polarization, angle of illumination, angle of incidence, angle of collection, one or more focus offsets of an illuminating light beam, a phase of the collected beam, a collection channel, a Fourier transform of returned light or sensing type.

3. The system of claim 1, wherein building, based on pixel values representative of potential defects of the first cluster, at least one first matching filter for the first cluster, comprises determining a weighted average of pixel values representative of the potential defects of the first cluster in the multiple images.

4. The system of claim 1, wherein:
  (a) the comparison is indicative of whether the given potential defect corresponds to a defect; and
  (b) if the given potential defect corresponds to a defect, the comparison is indicative of the first cluster to which the given potential defect corresponds the best among the plurality of first clusters.

5. The system of claim 1, configured to:
  if the comparison indicates that the given potential defect corresponds to a defect, include the given potential defect in the first subset, and
  repeat operations (2), (3), (4) and (5) until a convergence criterion is met.

6. The system of claim 1, configured to perform at least one of:

if the comparison indicates that the given potential defect corresponds to a defect, perform an optical inspection of a location of the given potential defect;

if the comparison indicates that the given potential defect corresponds to a defect, provide a class of the given potential defect based on the first cluster to which the given potential defects corresponds the best among the plurality of first clusters.

7. The system of claim 1, wherein building at least one first matching filter for the first cluster is based on pixel values representative of potential defects of the first cluster in the multiple images and on data representative of noise present in multiple images of the semiconductor specimen which differ by at least one parameter.

8. The system of claim 7, wherein data representative of noise present in the multiple images include data representative of cross-covariance between pixel values belonging to the multiple images of the semiconductor specimen which differ by at least one parameter.

9. A method of examination of a semiconductor specimen, the method comprising, by a processor and memory circuitry (PMC):
(1) for each potential defect of at least a first subset of potential defects of the semiconductor specimen, obtaining pixel values representative of the potential defect in multiple images of the semiconductor specimen which differ from each other by at least one parameter,
(2) classifying the potential defects of the first subset into a plurality of first clusters, wherein the classification is based on pixel values representative of the potential defects in the multiple images,
(3) for each first cluster
building, based on pixel values representative of potential defects of the first cluster in the multiple images, at least one first matching filter for the first cluster,
(4) for at least a given potential defect not belonging to the first subset,
processing pixel values representative of the given potential defect in multiple images of the semiconductor specimen which differ from each other by at least one parameter, with each first matching filter obtained for each of the first clusters, and
comparing an output of the processing with at least one threshold, wherein the comparison is indicative of at least whether the given potential defect corresponds to a defect.

10. The method of claim 9, wherein the multiple images differ from each other by at least one of: illumination spectrum, collection spectrum, illumination polarization, an illumination wavefront, collection polarization, angle of illumination, angle of incidence, angle of collection, one or more focus offsets of an illuminating light beam, a phase of the collected beam, a collection channel, a Fourier transform of returned light or sensing type.

11. The method of claim 9, wherein building, based on pixel values representative of potential defects of the first cluster, at least one first matching filter for the first cluster, comprises determining a weighted average of pixel values representative of the potential defects of the first cluster in the multiple images.

12. The method of claim 9, wherein:
(a) the comparison is indicative of whether the given potential defect corresponds to a defect; and
(b) if the given potential defect corresponds to a defect, the comparison is indicative of the first cluster to which the given potential defect corresponds the best among the plurality of first clusters.

13. The method of claim 9, comprising:
if the comparison indicates that the given potential defect corresponds to a defect, including the given potential defect in the first subset,
repeating operations (2), (3), (4) and (5) until a convergence criterion is met.

14. The method of claim 9, comprising at least one of:
if the comparison indicates that the given potential defect corresponds to a defect, performing an inspection of a location of the given potential defect;
if the comparison indicates that the given potential defect corresponds to a defect, providing a class of the given potential defect based on the first cluster to which the given potential defect corresponds the best among the plurality of first clusters.

15. The method of claim 9, wherein building at least one first matching filter for the first cluster is based on pixel values representative of potential defects of the first cluster and on data representative of noise present in multiple images of the semiconductor specimen which differ by at least one parameter.

16. The method of claim 15, wherein data representative of noise present in the multiple images include data representative of cross-covariance between pixel values belonging to the multiple images of the semiconductor specimen which differ by at least one parameter.

17. A non-transitory computer readable medium comprising instructions that, when executed by a processor, cause the processor to perform operations comprising:
(1) for each potential defect of at least a first subset of potential defects of the semiconductor specimen, obtain pixel values representative of the potential defect in multiple images of the semiconductor specimen which differ from each other by at least one parameter,
(2) classifying the potential defects of the first subset into a plurality of first clusters, wherein the classification is based on pixel values representative of the potential defects in the multiple images,
(3) for each first cluster,
building, based on pixel values representative of potential defects of the first cluster in the multiple images, at least one first matching filter for the first cluster,
(4) for at least a given potential defect not belonging to the first subset,
processing pixel values representative of the given potential defect in multiple images of the semiconductor specimen which differ from each other by at least one parameter, with each first matching filter obtained for each of the first clusters, and
comparing an output of the processing with at least one threshold, wherein the comparison is indicative of at least whether the given potential defect corresponds to a defect.

* * * * *